United States Patent
Mouler et al.

(10) Patent No.: US 9,354,096 B2
(45) Date of Patent: May 31, 2016

(54) SINGLE STARIGHT TUBE CORIOLIS FLOWMETER INCLUDING EXCITERS PROVIDED IN TWO PLANES AND PERPENDICULAR TO EACH OTHER

(71) Applicant: ARGOSY TECHNOLOGIES, Palm Desert, CA (US)

(72) Inventors: Peter Mouler, Irvine, CA (US); Aleksander Dondoshansky, Moscow (RU)

(73) Assignee: Argosy Technologies Ltd., Palm Desert, CA (US)

( * ) Notice: Subject to any disclaimer, the term of this patent is extended or adjusted under 35 U.S.C. 154(b) by 125 days.

(21) Appl. No.: 13/867,231

(22) Filed: Apr. 22, 2013

(65) Prior Publication Data

US 2014/0311255 A1    Oct. 23, 2014

(51) Int. Cl.
*G01F 1/84* (2006.01)

(52) U.S. Cl.
CPC .............. *G01F 1/8422* (2013.01); *G01F 1/849* (2013.01); *G01F 1/8427* (2013.01); *G01F 1/8431* (2013.01); *G01F 1/8436* (2013.01)

(58) Field of Classification Search
None
See application file for complete search history.

(56) References Cited

U.S. PATENT DOCUMENTS

| | | | |
|---|---|---|---|
| 5,616,868 A * | 4/1997 | Hagenmeyer et al. ... | 73/861.357 |
| 6,477,902 B1 * | 11/2002 | Oosawa et al. .......... | 73/861.355 |
| 6,684,715 B1 * | 2/2004 | Cage ........................ | 73/861.357 |
| 7,343,822 B2 * | 3/2008 | Kolahi et al. ............ | 73/861.357 |
| 2003/0089180 A1 * | 5/2003 | Amabili et al. .......... | 73/861.357 |
| 2005/0268731 A1 * | 12/2005 | Hussain et al. .......... | 73/861.357 |
| 2006/0179956 A1 * | 8/2006 | Kourosh .................. | 73/861.357 |
| 2006/0201260 A1 * | 9/2006 | Drahm et al. ............ | 73/861.357 |
| 2007/0113678 A1 * | 5/2007 | Baker et al. .............. | 73/861.357 |
| 2007/0151368 A1 * | 7/2007 | Hussain et al. .......... | 73/861.357 |
| 2011/0016991 A1 * | 1/2011 | Pankratz et al. ......... | 73/861.357 |
| 2012/0048034 A1 * | 3/2012 | Hussain et al. .......... | 73/861.357 |

* cited by examiner

*Primary Examiner* — Harshad R Patel
(74) *Attorney, Agent, or Firm* — Henry M. Feiereisen LLC

(57) ABSTRACT

A single straight tube flowmeter has a body; a tube through which a flow of fluid passes; two systems of excitation of oscillations in two planes which are perpendicular to one another and including adaptor units; a block of processing of information data including a phase shift of the adaptors located in one plane, frequency of oscillations of the tube, and temperatures of the tube and the body and outputting results of measurement of a mass flow rate and density of the fluid; and components for imparting to the tube a rotary motion relative to its neutral immovable position to increase accuracy of measurements by suppressing vibration disturbances.

2 Claims, 3 Drawing Sheets

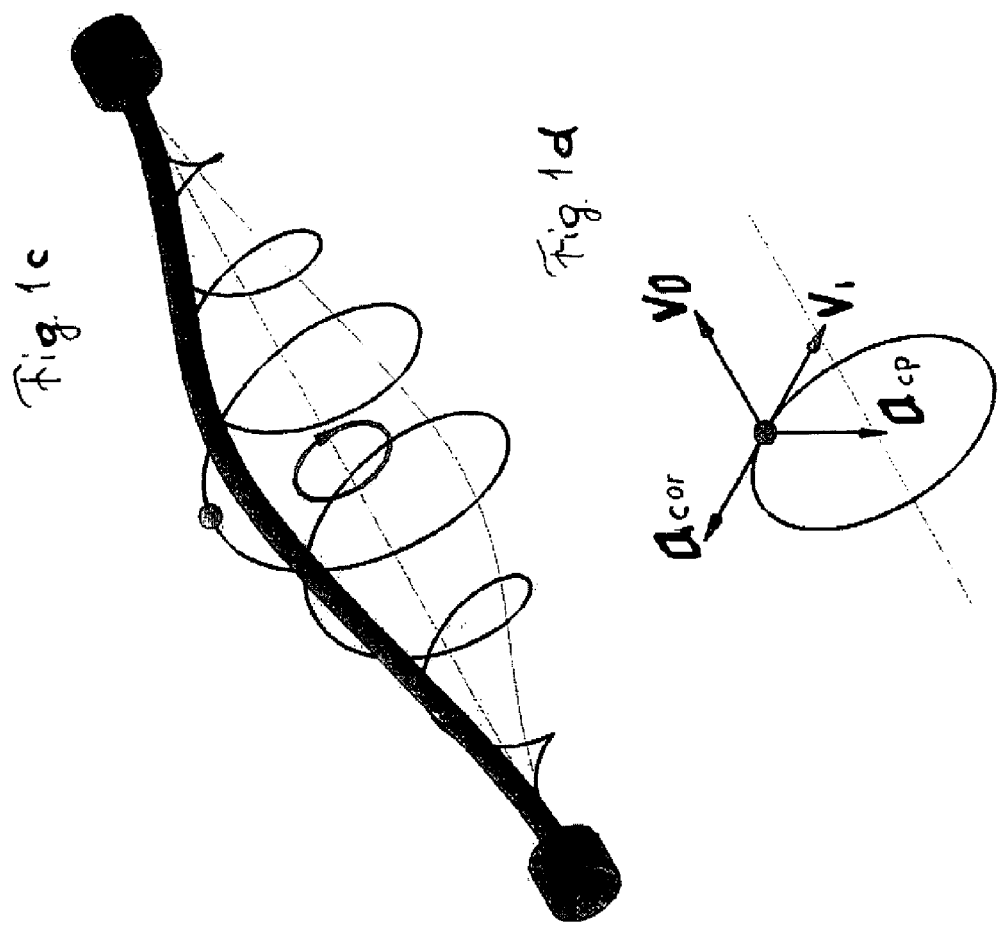
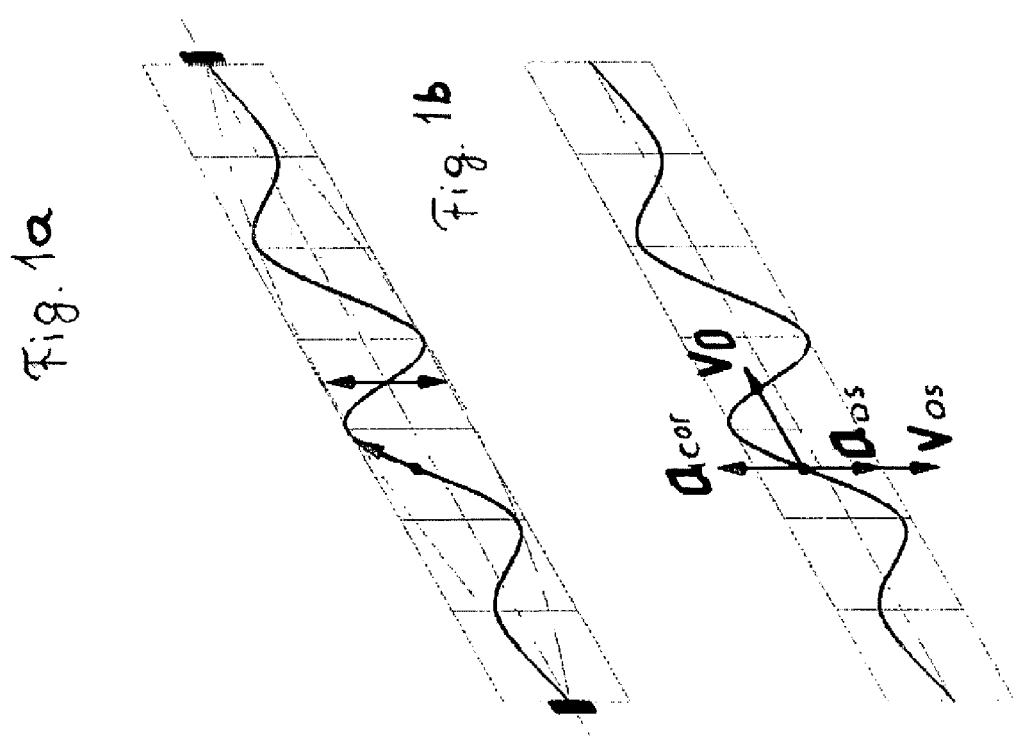

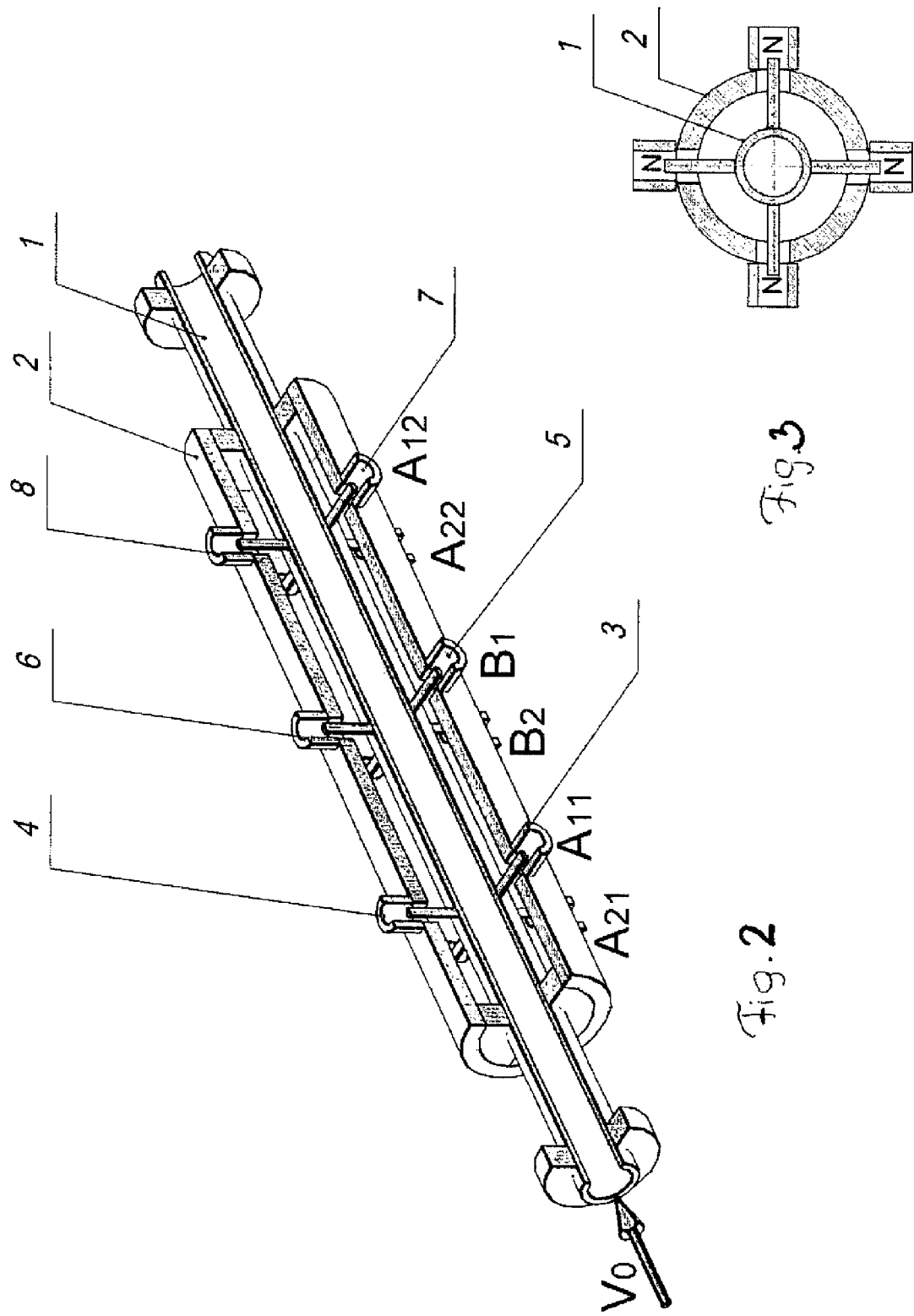

SINGLE STARIGHT TUBE CORIOLIS FLOWMETER INCLUDING EXCITERS PROVIDED IN TWO PLANES AND PERPENDICULAR TO EACH OTHER

BACKGROUND OF THE INVENTION

The present invention relates to single straight tube flowmeters, which are also known as Coriolis type flowmeters, and also to methods of operating of such flowmeters.

Flowmeters of this type are known in the art, such as for example the flowmeter PROMAX of Endress-Hauser Corporation, OPTIMASS 7000 of KPOHNE Flesstechnik GmbH & Co.KG, MICRO-MOTION Series T. etc. The common problem of such flowmeters is their dependency from exterior nonelectrical disturbances, such as vibrations of pipelines, alternating loads in flange connections of the device with the pipelines, and also loads caused by temperature differences of the pipe and the body.

In the known flowmeters steps are taken to deal with these problems. The presence of compression and stretching forces on the pipe which change its rigidity are taken into consideration by measurements of temperature in several points of the pipe and the body and providing corrections for changes to the flow rate and density by calculations in the electronic block. In addition, by selection of a material of the pipe and the body, a temperate range is increased. For example MICRO MOTION Corporation uses titanium that has high corrosion resistance and low thermal expansion coefficient.

Several approaches are used to deal with vibration disturbances to increase accuracy of flow rate and density measurements in single straight tube flowmeters. The tubes can be equilized by a mass which oscillates in a counter phase and with which the windings of the adapters and excitation unit are connected. It allows to bring its characteristics closer to the characteristics of two-tubes flowmeters. However when the density in the tube changes, the equilibrium is partially distorted, and also measures are taken to stabilize of a plane of tube oscillations by increasing the rigidity of the tube in a plane, that is perpendicular to the oscillation plane. This is provided by a configuration of partitions located near fixing points of the tube and fixedly connected with the body, by a construction of the equilizing device, by an additional body arranged inside an outer body on flexible pipelines with the flowmeter located inside of the additional body to unload it from an exterior vibrations.

These methods and means for fighting with vibration distuirbances are passive protection methods, that allow to reduce influence of vibration on the operation of the flowmeter, but cannot exclude it completely, since they can not adapt it to a value, direction and character of vibration.

SUMMARY OF THE INVENTION

Accordingly it is an object of the present invention to provide a single straight tube flowmeter, or a flowmeter of Coriolis type, and method of operating the same, which avoids the disadvantages of the prior art.

More particularly, it is an object of the present invention to provide a single straight tube flowmeter and a method of operating the same, that provide a higher accuracy of measurements in conditions of vibrations of different origins, including a passage of a two-phase fluid through the tube, and also increase a range of use of the flowmeters in accordance with temperature and type of fluids, for example a two-phase fluid.

In keeping with these objects and with others which will become apparent hereinafter, one feature of the present invention resides, briefly stated, in a single straight tube flowmeter and a method of operating the same, in which an influence of vibration is counteracted by providing a means and a step for imparting to the tube of the flowmeter a rotary motion relative to a neutral and controllable in regard to an amplitude and a phase.

Since with this motion the tube is always in a curved condition which is stable with the compressed tube, an increase in a range of working temperatures is achieved as well.

The single straight tube mass flowmeter of Coriolis type has a flow measuring tube immovably fixed on its ends in a body , two adaptor units located in an area of maximum bending of the tube and an excitation unit located in a middle of the tube are arranged on the body and on the tube, with each adaptor unit having four adaptors located in two perpendicular planes extending through the axis of the tube, and each adaptor having a magnet located on the tube and a winding located in the body of the flowmeter, with the windings of the adaptors located in one plane are connected in series, and the magnets located in the winding with the same poles, and with the excitation unit being identical to the constructions of the adaptors.

The electronic block of the flowmeter in accordance with the invention has a voltage amplifier, an electromagnet of generator of main oscillations , an electromagnet of generator of squared (perpendicular) oscillations, a four-squared multiplier, an auto-regulator of amplification which provides given amplitude modes of oscillation over main and squared (perpendicular) coordinate, a non-controlled phase-turner for setting an initial phase shift of excitation signals of a main and a squared (perpendicular) contour, a phase detector which generates a signal of deviation of phases from a given value in the main and in the squared (perpendicular) contour, a controlled phase-turner which maintains the given value of phase shift between the main and the squared (perpendicular) contour, a block of processing of information signals which, based on the input phase difference, temperatures of the tube and the body produces the values of a mass flow rate and density.

The new features of the present invention are set forth in particular in the appended claims.

The invention itself, however, both as to its construction and its manner of operation, will be best understood from the following description of the preferred embodiments which is accompanies by the following drawings.

BRIEF DESCRIPTION OF THE DRAWINGS

FIGS. 1a-1d are views which schematically show a motion trajectory of a particle of fluid in an oscillating tube, an acceleration and a speed of this particle, a motion trajectory of the fluid particle in a rotating tube, and an acceleration and a speed of the latter, correspondingly;

FIG. 2 is a perspective view of a single straight tube flowmeter in accordance with the present invention;

FIG. 3 is a view showing a transverse cross section of the single straight flow meter of FIG. 2, in accordance with the present invention.

DESCRIPTION OF PREFERRED EMBODIMENTS

Figure 4:
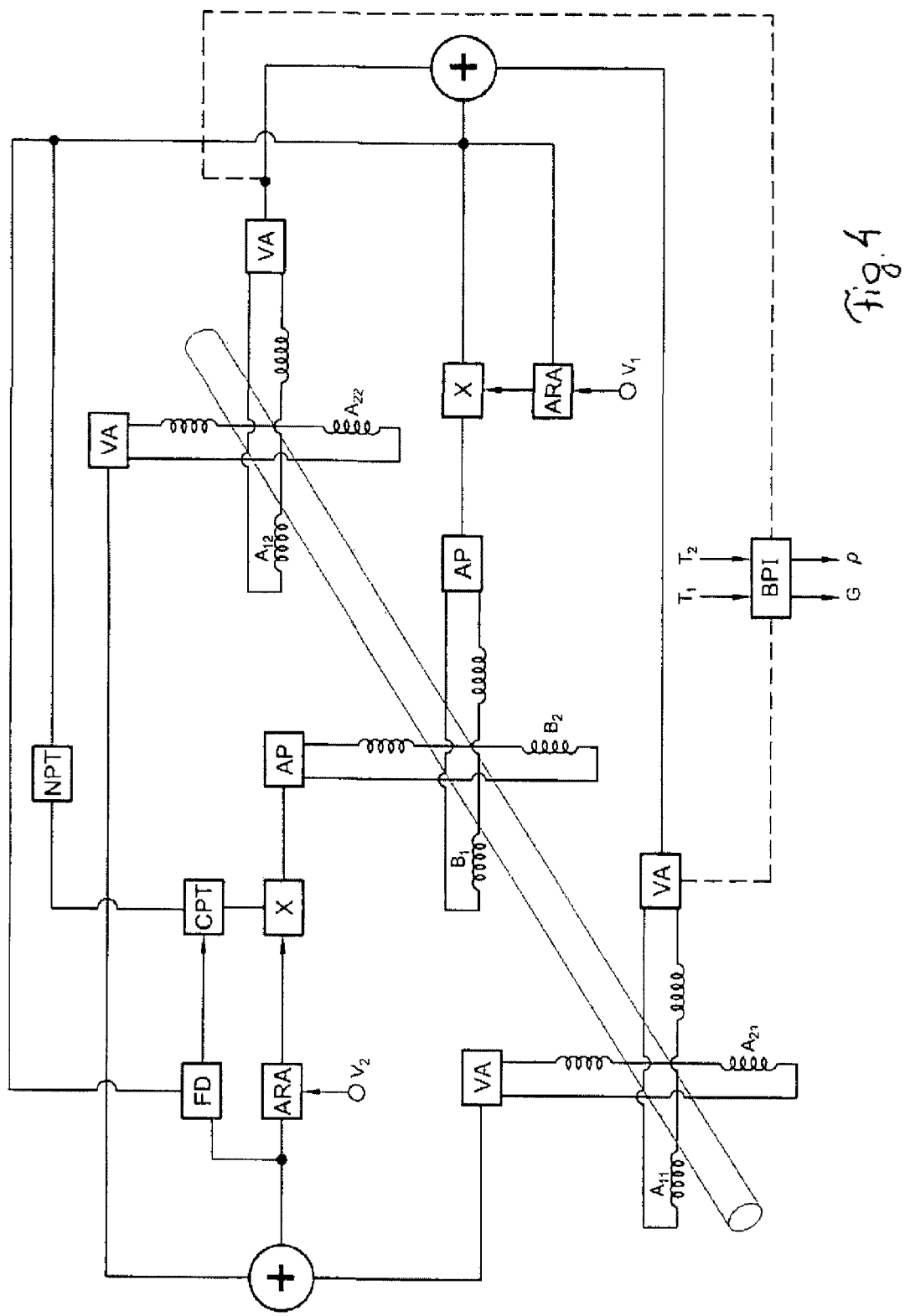
FIG. 4 is a view showing a block diagram of an electronic block of the inventive straight single tube flow meter.

FIG. 1a of the drawings shows a trajectory of motion of a particle of fluid, such as a liquid, in an oscillating tube. FIG.

1b of the drawings shows an acceleration and a speed of this particle, wherein $a_{co}r$ is a Coriolis acceleration, $V_0$ is a speed of the particle along the tube, $V_{os}$ and $a_{os}$ are correspondingly a speed and an acceleration in an oscillating motion of the particle. All speeds and accelerations are located in one plane.

FIG. 1c of the drawings shows a trajectory of motion of a particle of liquid in a rotating tube. FIG. 1d shows an acceleration and a speed of this particle, wherein $a_{co}r$ is a Coriolis acceleration, Vl is a linear speed of the particle over a circumference, $V_0$ is a speed of the particle along the tube, and $a_{cp}$ is a centripetal acceleration of the particle.

In the present invention the tube 1 performs a rotating motion which provides control over the whole trajectory of its motion, and therefore active compensation of a vibration factor. The effect from the rotating motion of the tube is illustrated in FIGS. 1a-1d, wherein FIGS. 1a, 1c show trajectories of movement of a particle of liquid during oscillating and rotating movements, while FIGS. 1b, 1d show speeds and accelerations during these movements. During the oscillating movement a vector of Coriolis acceleration is located in one plane and on one line with a vector of oscillating speed $V_{os}$ and oscillating acceleration a os, and the direction of the vector $a_{cor}$ corresponds to a sign of first derivative of coordinate of oscillating speed along the tube. In other words, it is positive on one side of the tube and is negative on another side relative to a speed vector $V_{os}$ and acceleration vector $V_{ac}$.

This makes possible to separate the effects caused by these accelerations, since during determination of phase difference which is directly proportional to a mass flow rate of the liquid, Coriolis accelerations are added, while oscillation accelerations are subtracted. However this is not so when there is a vibration. The first reason is that the Coriolis accelerations and the oscillation accelerations are lo longer located in one plane and on one line, and a phase difference starts to depend on oscillation acceleration. Secondly due to low selectivity of the adaptors in the plane of oscillation, the speed of vibration disturbance directly influence the phase difference.

If the rotating motion is imparted to the tube, then the vector of Coriolis acceleration and the vector of the centripetal acceleration (which replaces in this case the oscillation acceleration) are initially perpendicular to each other and the centripetal acceleration does not influence change of the phase difference. In addition, the linear speed and therefor the centripetal acceleration are maintained by the additional electronic block, so as to actively counteract the vibration disturbances of various origins, including those caused by a two-phase liquid.

The significant protection from disturbances of the flowmeter with the rotating tube is clearly justifiable from energy point of view. With the identical amplitude of the rotating and oscillating motion of the tube, the linear speed of the liquid in the tube is a few times greater than an average oscillation speed, and therefore during the rotating motion the energy of the pipe is greater as well, so that with the same energy of the vibration disturbances they have a smaller influence on the operation of the flowmeter.

The rotating motion of the tube is provided by the construction including the flowmeter shown in FIGS. 2 and 3 and the electronic block shown in FIG. 4.

The single straight tube mass flowmeter of Coriolis type is shown on a perspective view of FIG. 2. It has a flow measuring tube 1 which is immovably fixed on its ends in a body 2, for example by welding. Two adaptor units 3, 4 and 7, 8 located in an area of maximum bending of the tube and an excitation unit 5, 6 located in a middle of the tube are arranged on the body and on the tube. Each adaptor unit has 4 adaptors located in two perpendicular planes extending through the axis of the tube. Each adaptor has a magnet located on the tube 1 and a winding located in the body 2 of the flowmeter. The windings of the adaptors located in one plane are connected in series, the magnets are located in the winding with the same poles. The construction of the excitation unit 5, 6 is identical to the constructions of the adaptors.

The block diagram shown in FIG. 4 illustrates an electronic block of the flowmeter in accordance with the present invention. It includes a voltage amplifier VA, inlet and outlet magneto-electric adaptors A11, A12 of main oscillations, inlet and outlet adaptors of squared (perpendicular) oscillations A21, A22, an electromagnet of generator of main oscillations B1, an electromagnet of generator of squared (perpendicular) oscillations B2. It further includes a four-squared multiplier X, an auto-regulator of amplification ARA which provides given amplitude modes of oscillation V1.V2 over main and squared (perpendicular) coordinate, a non-controlled phase-turner NPT for setting an initial phase shift of excitation signals of a main and a squared (perpendicular) contour, and a phase detector FD which generates a signal of deviation of phases from a given value in the main and in the squared (perpendicular) contour. Finally, it include a controlled phase-turner CPT which maintains the given value of phase shift between the main and the squared (perpendicular) contour, a block of processing of information signals BPI which, based on the input phase difference, temperatures t1 and $t_2$ of the tube and the body produces the values of a mass flow rate and density (G,P)

The main units of the electronic block shown in FIG. 4 therefore include a block of excitation of main oscillations in a main plane which is a horizontal plane in FIGS. 2 and 3, a unit of excitation of squared (perpendicular) oscillations in a perpendicular plane which is a vertical plane in FIGS. 2 and 3, a unit of phase correction, and a unit of processing of information signals.

The block of excitation of main oscillations includes the voltage amplifiers VA with outputs connected with inputs of the adaptors 3 (A11) and 7 (A12) and with outputs connected with signal summators+whose outputs are connected with a first input of the four-squared multiplier X and, via the auto-regulator of amplification ARA, with a second input of the four-squared multiplier X whose exit, via an amplifier of power of main oscillation AP is connected to the windings of the generator of main oscillations B1 (5).

The block of excitation of squared (perpendicular) oscillations includes the voltage amplifiers VA with inputs connected to the outputs of the adaptors 4 (A21) and 8(A22), while the outputs are connected with the signal summator +, whose output is connected, via the auto-regulator of amplification ARA with a second input of the four-squared multiplier X, and the output of the latter is connected, via an amplifier of power of the squared oscillation AP to the windings of the generator of squared oscillations B2(6).

The block of phase correction includes the phase detector FD with inputs connected with the outputs of the signal summators+of main and squared oscillations while its output is connected with a first input of the controlled phase-turner CPT whose second output is connected, via the non-controlled phase-turner NPT, with an output of the signal summator+of main oscillations, and the output of the controlled phase turner CPT is connected with a first input of the four-squared multiplier X.

The block of processing of information signals BPI has inputs connected with outputs of amplifiers of adaptor signals, and on its output it outputs values of mass flow rate and density.

The single straight tube with active suppression of vibration disturbances operates in the following manner.

Signals from adaptors of main and squared oscillations are amplified and, via the auto-regulators of amplification are supplied, through the power amplifiers, to the blocks of excitation of main and squared oscillations. Thereby the tube starts oscillating with own frequency with equal amplitudes in the main and squared (perpendicular) plane. In order to generate these oscillations so that they are of rotating nature, a phase shift on the generator of squared oscillations is needed, which is achieved by the phase detector and the controlled phase-turner, The tube performs the rotating motion relative to a neutral position (a position in which there is no motion of the tube). When a flow of liquid passes through the tube, a phase difference is produced between the input and output adaptors. It is processed in the block of processing of information signals, together with the information about temperatures of the tube and the body, which processing is known per se, and values of mass flow rate and density are outputted.

It is therefore clear that in accordance with the invention the tube during its oscillations has a rotating trajectory, which is provided by the perpendicular (90 degrees) phase shift between the main and the squared (perpendicular) oscillations, that is achieved by setting the 90 degrees phase shift by the non-controlled phase-turner, during the operation is sensed by the phase detector, and based of signal of the phase detector, is maintained to be 90 degrees by the controlled phase-turner.

The invention is not limited to the details shown since various modifications and structural changes are possible without departing in any way from the spirit of the invention.

What is desired to be protected by Letters Patent is set forth in particular in the appended claims:

1. A single tube flowmeter, comprising a body; a tube through which a flow of fluid passes and which performs a rotating motion; two systems of oscillations in two planes which are perpendicular to one another and including adaptor units; a block of processing of information data including a phase shift of the adaptors located in one plane, frequency oscillations of the tube, and temperatures of the tube and the body and outputting results of measurement of a mass flow rate and density of the fluid; and an electronic block including a block of excitation of main oscillations, a block of excitation of perpendicular oscillations, a block of phase correction, and the block of processing of information data, wherein the block of excitation of main oscillations includes voltage amplifiers with inputs connected with outputs of the adaptors and outputs connected with a signal summator whose output is connected with a first input of a four-squared multiplier and, via an auto-regulator of amplification, with a second input of the four-squared multiplier whose exit, via an amplifier of power of the main oscillations is connected to winding of the block of excitation of the main oscillations, wherein the block of excitation of the squared oscillations includes power amplifiers whose inputs are connected with outputs of the adaptors of squared oscillations and outputs are connected with a signal summator whose input is connected via an auto-regulator of amplification to a second input of the four-squared multiplier whose output via an amplifier of power of the squared oscillations is connected to windings of the squared oscillations, wherein the block of phase correction includes a phase detector whose inputs are connected with outputs of the summators of signals of the main and squared oscillations while its output is connected to a first input of a controlled phase-turner, whose output, via a non-controlled phase-turner, is connected to an output of the summator of signals of the main oscillations, and an output of the controlled phase-turner is connected to a first input of the four-squared multiplier, and wherein the block of processing of information data is connected by irs inputs to outputs of amplifiers of signals of the adaptors.

2. A single straight tube flowmeter as defined in claim 1, wherein each of said adaptor units include four adaptors located in perpendicular planes extending through an axis of the tube and each having a magnet arranged on the tube and a winding arranged on the body.

* * * * *